Patented Mar. 7, 1939

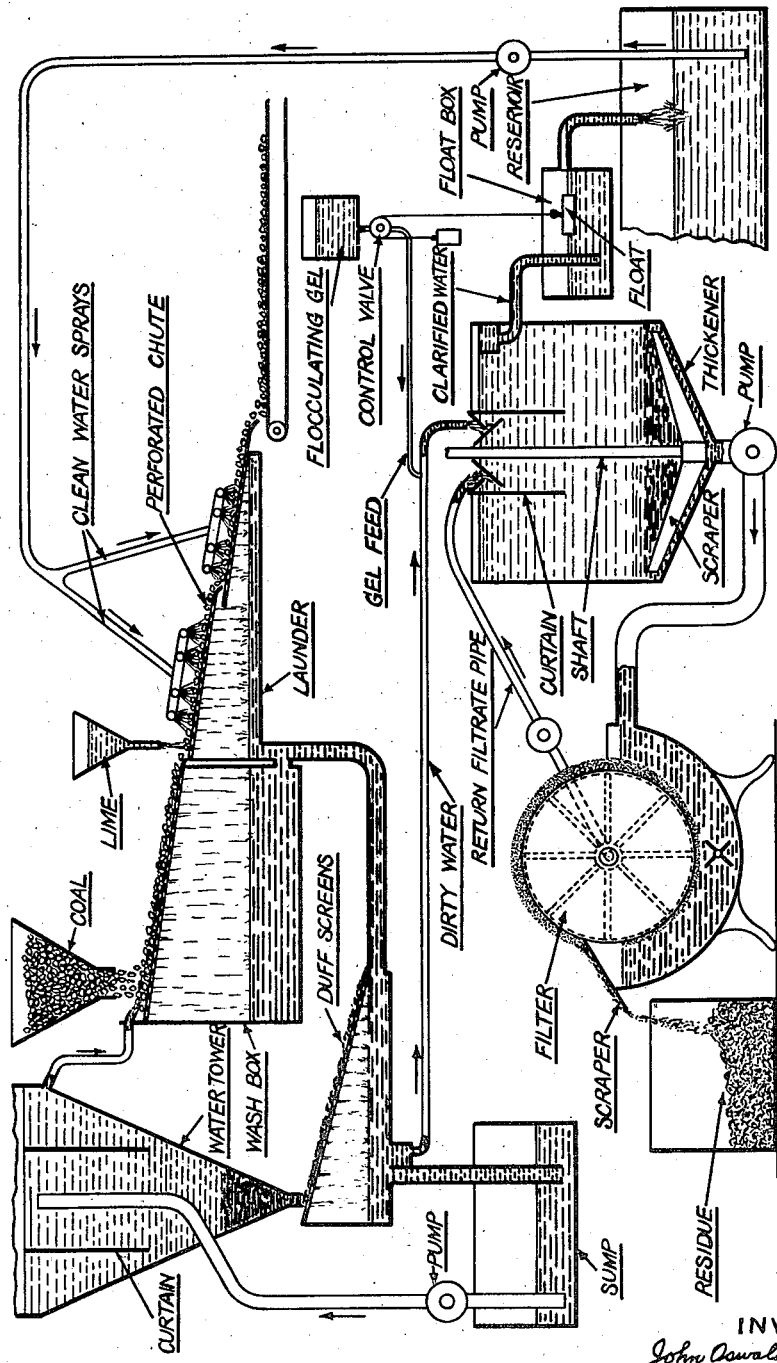

2,149,748

UNITED STATES PATENT OFFICE 2,149,748

TREATMENT OF DISPERSIONS

John Oswald Samuel, Pontlliw in Swansea, Wales, assignor, by mesne assignments, to Unifloc Reagents Limited, Swansea, Wales, a British company Application March 5, 1935, Serial No. 9,392
In Great Britain March 16, 1934

16 Claims. (Cl. 210—2)

This invention consists in improvements in or relating to the treatment of dispersions, in order to separate the dispersed material.

The invention is concerned particularly with the treatment of aqueous suspensions which are met with in practice in large quantities, such as coal washery water, sewage, the effluent from dye works, and suspensions of clay, slate, fine coal, flue dust, paper pulp and the like. In such suspensions the suspended material is frequently partly in a colloidal or semi-colloidal state so that its separation with a view to its recovery and/or the clarification of the liquid in which it is suspended is a matter of considerable difficulty. Other dispersions with which similar difficulties are encountered are still waste, water from cleaning plants of all kinds and from ore reduction plants, and soiled oils (that is oils containing fine dust or foreign matter), and also suspensions of substances which are precipitated by chemical reagents in substantially colloidal form, one example being the precipitate obtained by adding calcium hydroxide to hard water containing magnesium bicarbonate, and another example colloidal barium sulphate as precipitated by barium chloride from acid or neutral solutions of sulphates; such precipitates are in a very fine state of subdivision and are very difficult to filter.

A general mthod adopted for separating the dispersed material from dispersions consists in allowing the material to settle and then to decant or to filter. With large quantities of dispersions containing a high proportion of colloidal or semi-colloidal material, however, this method has many disadvantages on account of the time necessary and also the large areas required for settling tanks or ponds, and moreover it is only partially effective.

It is an object of the present invention to facilitate the separation of the dispersed material from dispersions by treating the dispersion with a flocculating gel which will cause the dispersed material to flocculate and assume a condition which permits its ready removal from the dispersion medium either by settling or filtering or a combination of both.

According to the present invention a process for the treatment of dispersions to separate dispersed material therefrom, comprises adding to the dispersion a flocculating gel obtained by subjecting a mixture of an amylaceous material and a neutral metallic salt to heat and agitation until the cells of the amylaceous material burst and the whole forms a thick and gummy paste.

The process for the production of the flocculating gel which is to be employed in accordance with the process of the present invention which is stable, has highly efficient and permanent flocculating properties, is free from particles of amylocellulose, is elastic, of gummy consistency and substantially neutral and is insoluble in water although capable of dispersion therein to give a stable emulsion of particles having a strong positive charge, is described and claimed in copending application Ser. No. 113,500 filed November 30, 1936, which has been divided from the present application.

When preparing the flocculating gel which is to be used in accordance with the invention it is found to be preferable to employ a salt or mixture of salts which will take up the cellulose membranes of the amylaceous cells, that is will form a mass which is of gel structure and apparently a viscous solution and a mixture of calcium chloride and zinc chloride is found to be particularly effective for this purpose.

It has already been proposed to prepare amylaceous flocculating gels, for example by the physicochemical combination of amylaceous material with hydroxides at temperatures which prevent the rupture of the cell membranes (see for example the specification of Henry's British Patent No. 322,798), and by the electrical activation of amylaceous cells at a temperature sufficient only to expand the cells without bursting them (see for example the specification of Campbell's British Patent No. 405,038). It has also been proposed to prepare a composition of matter useful for deflocculating solid bodies and for other purposes, by roasting starchy materials to a temperature approximating to but below that at which carbonisation occurs, grinding the roasted product and treating it with an ammoniacal solution (see for example the specification of Acheson's British Patent No. 157,887). The present invention is distinguished from these prior suggestions in that the amylaceous material is heated and agitated with a neutral metallic salt until the cells of the amylaceous material burst and a thick paste which is clear and is of gummy consistency is obtained. This paste maintains its flocculating action substantially indefinitely and may be readily diluted with water prior to use. Experiments seem to show that all amylaceous flocculating gels previously proposed by other parties do not retain their flocculating action but must be used soon after production if they are to be at all effective.

According to the preferred method of producing the flocculating gel which is to be used in accordance with the present invention a cream of starch e. g. potato starch, in cold water is added with constant stirring to a hot solution of the neutral metallic salt. A temperature of about 70 to 150° C. and the constant stirring are maintained until a thick paste which is clear and has a gummy consistency is formed. The gel is formed more quickly at the higher temperatures. This paste may be kept for long periods without losing its flocculating action. Before use it is preferably diluted with water and is added to the dispersion to be treated usually in small quantities. Soon after the addition of the gel, the dispersed material forms into flocs or flakes which rapidly sink and may be easily removed.

Any amylaceous material may be treated to give an effective paste for use in accordance with the invention the most convenient being starch obtained for example from corn, maize, rice, potatoes, fibrous or cellulose material containing starch, farina or fecula. As far as can be at present ascertained the presence of proteins such as gluten or gliadin, commonly associated with starch, has no effect on the production of a suitable paste.

Preferably the neutral metallic salt or mixture of salts should have all the following properties in order that the cellulose membranes of the amylaceous material may be taken up completely:—

1. The salt should be capable of dissolving in water to form a solution having a viscosity at least 3.3 times that of water.
2. The solution having the necessary viscosity should have a boiling point of at least 130° to 135° C.
3. The molecular heat of dilution of the salt in water should be positive and not greater than 3,500 calories per gram molecule. The molecular heat of dilution is to be understood as the heat in calories which is evolved when a solution of a gram molecule of the salt or salts dissolved in such a quantity of water as to produce a solution having a viscosity of at least 3.3 times that of water and a boiling point of 130° C. is diluted with an equal volume of water.

The following salts were found to satisfy all the above conditions and are satisfactory for use in accordance with the invention:—

Calcium chloride + zinc chloride, zinc chloride, calcium chloride + mercuric chloride, and magnesium chloride + mercuric chloride.

The thiocyanates of lithium, calcium, magnesium, strontium, manganese, carium alone or in conjunction with calcium chloride are also suitable; and also the double salts: sodium manganese thiocyanate, barium manganese thiocyanate, and sodium zinc thiocyanate.

It is interesting to note that normally, aqueous solutions of the salts mentioned act as agents for taking up the cellulose only when the conditions set forth above are met.

An aqueous solution of calcium chloride alone does not take up the cellulose very satisfactorily because the heat of dilution of calcium chloride is too high, and as a result a relatively unstable gelled product with amylaceous material is obtained. The addition of zinc chloride or mercuric chloride or a thiocyanate as mentioned above, reduces the heat of dilution below the stipulated maximum with the result that the solution of the mixture now takes up the cellulose membranes composing the starch cells, and the gelled product is stable.

It has been found that a particularly good flocculating gel can be prepared from starch, calcium chloride and zinc chloride in the following manner:

10 grams of starch e. g. potato starch, are mixed into a cream with 20 ccs. of cold water. This is added with constant stirring to a solution consisting of 5 grams of calcium chloride (anhydrous) and 3 grams of zinc chloride (anhydrous) in 20 grams of water and the whole vigorously stirred at 70 to 150° C. Two distinct changes in the stirred mixture are apparent. Firstly the mixture assumes a thick and very pasty condition which marks the stage when the starch cells burst, and then, on further stirring at this temperature this pasty product gradually assumes a clear and gummy consistency and marks complete gelification. The complete treatment takes between 15 to 20 minutes.

The relative concentrations of starch, calcium chloride and zinc chloride may be varied, when it is found that the size of floc or flake produced in the dispersion treated varies in a corresponding manner. The concentration of calcium chloride should not be increased to too great an extent as very high concentrations give a gelled product which is too thick, is difficult to mix with water, and is unstable at high dilutions.

The presence of zinc chloride aids gelification, and results in a flocculating gel giving a bigger and heavier floc than when calcium chloride is used alone. In addition the presence of the zinc chlorides aids the taking-up of the ruptured cell membranes and prevents decomposition and precipitation of the starch.

It is to be understood that the concentrations of the above-mentioned compounds and also the temperature and time necessary for complete gelification should be varied to suit the particular amylaceous material employed.

It is found that the flocculating gel formed as indicated above for use in accordance with the invention assumes a very high state of flocculating efficiency immediately after manufacture, but this efficiency falls off gradually on the first day or so and then the gel consistently increases in efficiency over a period of approximately six days until an exceedingly high flocculating efficiency is attained, which is then maintained substantially indefinitely.

Sometimes (for example when flocculating effluents containing food particles, such as a dispersion of bone meal), it is desirable not to use flocculating gel including zinc chloride, in order to avoid contamination of the flocs with zinc. In such cases the amylaceous material may be gelled with calcium chloride only, and preferably .1 to .5% of an organic compound such as an essential oil (e. g. citronella oil, or oil of cloves) or an aromatic hydroxy compound of the phenolic class (e. g. phenol or cresol) or aliphatic or aromatic aldehydes (e. g. benzaldehyde or formaldehyde) are added to the gel to prevent decomposition and precipitation of the starch. This is necessary because calcium chloride alone, although having the required viscosity and boiling point, has too great a heat of dilution for its aqueous solution to take up all the cells of the broken starch granules. Therefore the addition of the above substances will prevent decomposition and precipitation of these cells.

Preservatives may also be added when solutions of other salts are employed but it is found that when a solution is employed which takes up the cellulose membranes of the amylaceous material a stable product is obtained without the addition of a preservative being necessary.

Although the flocculating gel which is to be used according to the invention is found to flocculate efficiently all dispersions coming within a pH range of approximately 3 to 12, it is found that clarification of the dispersion medium is more readily obtained if the dispersion is slightly alkaline or neutral, preferably between the range pH 7 and 10. It has also been found that the flocculation is more complete and a clearer liquor remains when the dispersion is rendered alkaline prior to its treatment with the flocculating gel.

The desired alkalinity can be obtained by the addition of the hydroxides or oxides of the alkali and alkaline earth metals, such as sodium and potassium hydroxides and calcium and barium oxides and hydroxides.

The very good flocculation obtained by the process of the invention is believed to be due mainly to the very high state of dispersion of the flocculating gel. It is found that when a small quantity of the gel is agitated in a large volume of water a colloidal suspension of the gel in water is formed, each suspended particle carrying a strong electric charge conferred to it by ionic adsorption. It would seem therefore that the dispersed matter in the liquid dispersion concentrates together on the surface of the suspended flocculating gel particle and the whole falls together as a floc.

In carrying out the invention, the flocculating gel prepared as indicated above that is in accordance with the process of production described in my copending application for United States Letters Patent Ser. No. 113,500 filed November 30, 1936, which is a division of this application, is first made up to a dilute solution with water, when the solution flows readily and gives maximum flocculating efficiency. The mixing with water should be carried out carefully by first adding, with constant stirring, a volume of water equal to about 50% of the volume of the flocculating gel to be diluted. In a few minutes, usually about 2 minutes, the water is vigorously absorbed by the gel with only a very slight lowering of the viscosity. More water is then added gradually with constant stirring until the required dilution is obtained. If the dilution be carried on too rapidly, the flocculating gel will form lumps which are difficult to dissolve and it is then necessary to allow the solution to stand for a period of about 30 minutes, after which the lumps swell and go into solution rapidly.

Before the addition of the flocculating gel the dispersion to be treated is preferably rendered slightly alkaline (e. g. pH 8 to 10) with lime water or sodium hydroxide, it is then stirred whilst the solution of flocculating gel is added in a series of small quantities until maximum flocculation is obtained.

It is already the practice in certain commercial processes, for example in coal washing, to add lime to assist flocculation of the dispersed material, and in carrying out the present invention with such dispersions it may well be that the dispersion is already sufficiently alkaline.

In most cases it is found that there is a specific range of pH for each dispersion, whether of coal or other material, at which flocculation may be most advantageously effected and that it is desirable to ascertain this range initially by suitable tests.

The quantities of lime or its equivalent, and of flocculating gel, which must be added to obtain effective flocculation will vary with the dispersion being treated, as a specific example, with the effluent from a coal washery plant quantities of flocculating gel equivalent to .2 to .4 lbs. of undiluted flocculating gel per 1000 gallons of dispersion have been found to cause maximum flocculation of the dispersed solids to give particles of about 4 to 4.5 mms. in diameter.

When treating large quantities of dispersion such as the flow of water from coal washery plant, the required amounts of lime and flocculating gel may if desired be added in bulk, or proportions of the reagents may be added from time to time.

The process of the present invention is particularly applicable to the effluent or slurry from coal washery plant, which contains both coal and clayey matter, and it is of particular interest to observe that the process of the invention is effective not only in causing the flocculation of the larger particles present but also the flocculation of the slimes. The present practice with coal washery plant is to employ the same water for a number of washings, for example in a Baum washer, and only to pass the effluent, or a part of it, for clarification at the end of a day's working or when the amount of suspended solid is such that the water is no longer effective.

This practice is usually influenced by two factors, a limited water supply, and the large clarifying plant necessary if pollution of the rivers or the like into which the effluent is discharged is to be avoided. On account of the speeding up of separation resulting from the process of the invention, however, a practically continuous circuit can be formed whereby the suspended matter is flocculated, the water clarified by a thickener and then returned for washing purposes. In this way the total quantity of water can be reduced and with it the size of the clarification plant (e. g. filters and the like) and the area necessary for settling tanks or ponds.

Apparatus for carrying out a process as just described is illustrated diagrammatically in the accompanying flow sheet. The flow sheet shows a coal washing plant from which part of the dirty water is "bled off" continuously and clarified by the method in accordance with the present invention, and the clarified water is returned to the washing plant. It is to be understood that the flow sheet is purely diagrammatic and that the individual pieces of the apparatus are not shown to scale. In the apparatus illustrated the coal is passed through a wash box from which it drops to a perforated chute or vibro sorting screens and passes on to a conveyor belt. The passage of the coal through the wash box is assisted, and the coal is washed, by water taken from the top of the water tower. As the coal passes down the perforated chute it is sprayed with clean water. The water from the wash box carrying the fine duff coal and the water from the clean water sprays is collected and passed into a sump from which it is pumped to the water tower where the duff settles out to the bottom. This duff from the bottom of the tower is removed by passing the water through fine dewatering screens as shown. Part of the water, substantially equal to the water added through the clean water sprays, is "bled off" at a fixed rate after it has passed through the screen into the main launder. In practice the coal may be graded as it passes through the wash box and down the perforated chute by provision of suitable apparatus. Lime, or any other alkali, may be added to the washing water at any suitable point, for example it may be added as the coal and water pass through the wash box as shown in the flow sheet. The dirty water which is "bled off" is passed to the centre of a thickener which is provided with a cylindrical curtain as shown. Flocculating gel, prepared in accordance with the present invention is also added to the dirty water inlet pipe at a point outside the thickener and an intimate contact of the two liquids is assured by a swirling action inside the thickener curtain and the dispersed solids in the dirty water flocculate and sink to the bottom whilst the clarified water rises to the surface outside the curtain and passes over a weir to a float box and thence to a reservoir from which it is pumped, as desired, to the clean water sprays. The quantity of flocculating gel added to the liquid in the thickener is controlled by a suitably placed control valve operated by a float on the surface of the water in the float box.

The flocculated solids from the dirty water, which sink to the bottom of the thickener to form a sludge, are drawn to the centre of the cone by means of a slowly rotating spiral scraper, and are then pumped to the trough of a filter of a well known (for example Rovac or Oliver) type comprising a rotating cylinder provided on its surface with fine copper mesh and divided internally into a number of segments. A vacuum is created in each segment so that liquid is drawn in and solids collect on the surface. As each segment reaches the scraper the vacuum is released and the pressure in the segment is raised above atmospheric pressure so that the layer of solid on the surface is blown off and falls down the scraper into a suitable receptacle. The water drawn into each segment is passed back to the thickener inside the curtain so that it is again subjected to the clarifying treatment.

A further important feature of the invention is the possibility it presents for fractional flocculation. Taking coal washery effluent as an example, the larger particles of coal can be separated with the aid of a less active flocculating agent such as lime and utilised as fuel, whilst the clayey matter and slimes can be subsequently separated with the aid of a flocculation gel in accordance with the invention.

The invention may be effectively applied to all types of dispersions, particularly aqueous suspensions such as those referred to at the beginning of this specification, and also to the colloidal or almost colloidal precipitates obtained by the addition of an alkali to aqueous solutions, for example, hard water containing magnesium and calcium bicarbonates. The addition of the flocculating gel causes the finely divided precipitate to flocculate so that it settles rapidly and may be easily filtered.

It is a further advantage of the present invention that the flocs or flakes formed are rigid and by reason of strong surface forces will withstand vigorous agitation, reprecipitation and pumping without being destroyed. In addition the flocs or flakes are of such a nature that they will drain freely on a filter, irrespective of whether a vacuum be used or not, so that dispersed material is left in a coarse powdery condition in which it is free from the sliminess which is so commonly associated with other flocculating gels; for example, sewage when filtered leaves a slurry residue on the filter paper, which remains wet and slimy even after a few hours standing, if on the other hand the sewage is first flocculated in accordance with the present invention and then filtered, a residue is obtained on the filter which in a very short time assumes a dry state and can be handled.

I claim:

1. The method of separating dispersed material from dispersions comprising adding to the dispersion a flocculating gel which is of gummy consistency, is clear and free from membranes of the amylaceous cells, and is capable of dispersion in water to give particles having a strong electric charge, and which is the reaction product of an amylaceous material and a metallic salt capable of forming an aqueous solution which is not strongly acid, is not strongly alkaline, has a viscosity at least 3.3 times that of water, a boiling point of at least 130° C. and a positive molecular heat of dilution not greater than 3,500 calories per gram molecule.

2. The method of separating dispersed material from dispersions comprising adding to the dispersion a flocculating gel which is of gummy consistency, is clear and free from membranes of the amylaceous cells, and is capable of dispersion in water to give particles having a strong electric charge and which is the reaction product of an amylaceous material and a mixture of metallic salts, said mixture being capable of forming an aqueous solution which is not strongly acid, is not strongly alkaline, has a viscosity at least 3.3 times that of water, a boiling point of at least 130° C. and a positive molecular heat of dilution not greater than 3,500 calories per gram molecule.

3. The method of separating dispersed material from dispersions comprising adding to the dispersion a flocculating gel which is of gummy consistency, is clear and free from membranes of the amylaceous cells, and is capable of dispersion in water to give particles having a strong electric charge and which is the reaction product of an amylaceous material and zinc chloride.

4. The method of separating dispersed material from dispersions comprising adding to the dispersion a flocculating gel which is of gummy consistency, is clear and free from membranes of the amylaceous cells, and is capable of dispersion in water to give particles having a strong electric charge, and which is the reaction product of an amylaceous material and a mixture of zinc chloride and calcium chloride.

5. The method of claim 1 wherein the dispersion to be treated is first rendered alkaline.

6. The method of claim 2 wherein the dispersion to be treated is first rendered alkaline.

7. The method of claim 3 wherein the dispersion to be treated is first rendered alkaline.

8. The method of claim 4 wherein the dispersion to be treated is first rendered alkaline.

9. A continuous process for the treatment of coal washery water which comprises adding an alkali to the water as it comes from the washery plant, adding small proportions of a flocculating gel which is of gummy consistency, is clear and free from membranes of the amylaceous cells, and is capable of dispersion in water to give particles having a strong electric charge, and which is the reaction product of an amylaceous material and a metallic salt capable of forming an aqueous solution which is not strongly acid, is not strongly alkaline, has a viscosity at least 3.3 times that of water, a boiling point of at least 130° C. and a positive molecular heat of dilution not greater than 3,500 calories per gram molecule, passing the water to a thickener and returning the clarified water to the washery plant.

10. A continuous process for the treatment of coal washery water which comprises adding an alkali to the water as it comes from the washery plant, adding small proportions of a flocculating gel which is of gummy consistency, is clear and free from membranes of the amylaceous cells, and is capable of dispersion in water to give particles having a strong electric charge and which is the reaction product of an amylaceous material and a mixture of metallic salts, said mixture being capable of forming an aqueous solution which is not strongly acid, is not strongly alkaline, has a viscosity at least 3.3 times that of water, a boiling point of at least 130° C. and a positive molecular heat of dilution not greater than 3,500 calories per gram molecule, passing the water to a thickener and returning the clarified water to the washery plant.

11. The process of claim 9 wherein lime is employed as the alkali.

12. The process of claim 10 wherein lime is employed as the alkali.

13. A process for the treatment of coal washery water comprising adding a coagulant to precipitate large particles which may be recovered by settling and filtering, and then treating the partly clarified liquid in order to flocculate the finer particles and slimes by adding a flocculating gel which is of gummy consistency, is clear and free from membranes of the amylaceous cells, and is capable of dispersion in water to give particles having a strong electric charge, and which is the reaction product of an amylaceous material and a metallic salt capable of forming an aqueous solution which is not strongly acid, is not strongly alkaline, has a viscosity at least 3.3 times that of water, a boiling point of at least 130° C. and a positive molecular heat of dilution not greater than 3,500 calories per gram molecule.

14. A process for the treatment of coal washery water comprising adding a coagulant to precipitate large particles which may be recovered by settling and filtering and then treating the partly clarified liquid in order to flocculate the finer particles and slimes by adding a flocculating gel which is of gummy consistency, is clear and free from membranes of the amylaceous cells, and is capable of dispersion in water to give particles having a strong electric charge and which is the reaction product of an amylaceous material and a mixture of metallic salts, said mixture being capable of forming an aqueous solution which is not strongly acid, is not strongly alkaline, has a viscosity at least 3.3 times that of water, a boiling point of at least 130° C. and a positive molecular heat of dilution not greater than 3,500 calories per gram molecule.

15. The method of separating dispersed material from aqueous dispersions comprising adding to the dispersion an amylaceous flocculating gel which is of gummy consistency, is clear and free from membranes of the amylaceous cells and is capable of uniform dispersion in water to give particles having a strong electric charge, said gel being the reaction product of an amylaceous material and a metallic salt capable of taking up cellulose in aqueous solution.

16. The method of separating dispersed material from aqueous dispersions comprising adding to the dispersion an amylaceous flocculating gel which is of gummy consistency, is clear and free from membranes of the amylaceous cells and is capable of uniform dispersion in water to give particles having a strong electric charge, said gel being the reaction product of an amylaceous material and a mixture of metallic salts capable of taking up the amylocellulose forming the sac of the amylaceous material in aqueous solution.

JOHN OSWALD SAMUEL.